(12) United States Patent
Brown

(10) Patent No.: US 7,168,363 B1
(45) Date of Patent: Jan. 30, 2007

(54) BARBEQUE GRILL SYSTEM

(76) Inventor: Tony A. Brown, 480 Big Tree Dr., Ponte Vedra Beach, FL (US) 32082

( * ) Notice: Subject to any disclaimer, the term of this patent is extended or adjusted under 35 U.S.C. 154(b) by 169 days.

(21) Appl. No.: 10/664,619

(22) Filed: Sep. 19, 2003

Related U.S. Application Data

(60) Provisional application No. 60/411,898, filed on Sep. 19, 2002.

(51) Int. Cl.
*A47J 37/00* (2006.01)

(52) U.S. Cl. ............... 99/421 M; 99/339; 99/357; 126/25 R

(58) Field of Classification Search ............ 99/421 M, 99/421 R, 419, 339, 340, 450, 357, 484; 126/25 R, 29, 9 R
See application file for complete search history.

(56) References Cited

U.S. PATENT DOCUMENTS

| | | | |
|---|---|---|---|
| 2,278,734 A | 4/1942 | Perry | |
| 3,257,936 A * | 6/1966 | Holka et al. | ......... 99/421 R |
| 3,294,010 A * | 12/1966 | Zentko | ......... 99/421 M |
| 3,524,980 A | 8/1970 | Meloan | |
| 5,257,169 A | 10/1993 | Walendziak | |
| D383,235 S | 9/1997 | Murch, Sr. | |
| 5,664,875 A | 9/1997 | Hegedus | |
| 5,676,045 A | 10/1997 | Faraj | |
| 5,892,656 A | 4/1999 | Bass | |
| 6,053,163 A | 4/2000 | Bass | |
| 6,073,623 A | 6/2000 | Maschhoff | |
| 6,079,843 A | 6/2000 | Latella et al. | |
| 6,132,055 A | 10/2000 | Grisamore et al. | |
| 6,202,640 B1 | 3/2001 | Naperola et al. | |
| 6,257,227 B1 | 7/2001 | Harbin | |
| 6,301,194 B1 | 10/2001 | Cauchy | |
| 6,344,630 B1 * | 2/2002 | Jarvis et al. | ......... 219/386 |
| 2001/0033484 A1 | 10/2001 | Gilley | |
| 2003/0111070 A1 | 6/2003 | DeMars | |

FOREIGN PATENT DOCUMENTS

JP 59112125 * 6/1984

* cited by examiner

*Primary Examiner*—Reginald L. Alexander
(74) *Attorney, Agent, or Firm*—David E. Pritchard

(57) ABSTRACT

A barbeque grill system include a barbeque grill, a heat source, a thermoelectric generator operable for producing electric power, and a barbeque-grill accessory capable of using electric power. In further detail, the thermoelectric generator is activatable by heat produced from the heat source, so as to produce electric power. In addition, the barbeque-grill accessory is designed so as to receive electric power produced by the thermoelectric generator, once the thermoelectric generator has been activated by heat produced from the heat source.

16 Claims, 2 Drawing Sheets

BARBEQUE GRILL SYSTEM

CROSS-REFERENCE TO RELATED APPLICATION

This patent document claims the benefit of the filing date of Provisional U.S. Patent Application No. 60/411,898, entitled "Self Powered Barbeque Grill Light" and filed on Sep. 19, 2002. The entire disclosure of the provisional U.S. patent application is incorporated into this patent document by reference.

BACKGROUND OF THE INVENTION

1. Field of the Invention

This invention is directed to barbeque grills, and more particularly, to barbeque grills having grill accessories such as, for example, an illuminating light, a rotisserie, or the like.

2. Description of the Related Art

The concept of an electrically-powered barbeque-grill accessory such as a grill light or rotisserie is known. However, these accessories are powered by batteries, or by power cords connected to conventional 110-volt AC electrical outlets. While such batteries and power cords may be functional, they present several limitations and drawbacks to people who want to use such accessories. For example, if batteries are used, a person must either replace or recharge the batteries. Also, unless one has an inventory of fresh back-up batteries, it is quite possible that the batteries will run out of power when the barbeque grill and grill accessories are being used.

If, on the other hand, a power cord is used, the variety of locations in which the barbeque grill may be used is severely limited. In addition, such power cords can produce safety hazards due, for example, to individuals tripping over the power cords. Also, in some instances, the power cords may be unsightly.

SUMMARY OF THE INVENTION

The present invention overcomes the above-mentioned limitations and drawbacks by harnessing the thermal energy from a barbeque grill, and/or from a nearby source of heat, and transforming that thermal energy into electrical energy which may be used to power one or more barbeque-grill accessories.

One aspect of the invention includes a barbeque grill, a thermoelectric generator, and a grill accessory. In further detail, the barbeque grill includes a heat source, and the thermoelectric generator is activatable by heat produced from the heat source, so as to produce electric power. The given barbeque-grill accessory is constructed and arranged so as to receive electric power produced by the thermoelectric generator, once the generator has been activated by heat produced from the heat source of the barbeque grill.

The barbeque-grill accessory may be any suitable accessory, with non-limiting examples including a light source and a rotisserie. If a light source is used, any suitable light-producing member may be used. For example, the light source may include one or more light-emitting diodes ("LEDs"), halogen bulbs, xelogen bulbs, fluorescent bulbs, neon bulbs, fiber-optic filaments, or incandescent bulbs, as well as any suitable combination of such bulbs.

In another aspect, the light source may be positioned on an elongated arm, such as, for example, a gooseneck. Also, the elongated arm may be adjustable, thereby allowing a user to move the light source from one position or orientation to any of a number of other different positions or orientations. In this fashion, for example, a user may choose to direct the illuminating light from the light source onto a side-shelf of the barbeque grill, thereby allowing the user to add spices to, or otherwise prepare, the food to be grilled. Also, once the food has been placed on the food rack of the grill, the user may bend the adjustable arm so as to direct the illuminating light onto the grill surface and/or the food positioned on the grill surface. Also, if desired, the elongated arm may be releasably attachable to the barbeque grill, thereby allowing a user to move the entire arm from one location to another. Also, in this fashion, a user has the option of removing the arm for periodic cleaning or for storage.

In another aspect of the invention, the barbeque grill includes a sidewall, and the light source is mounted at the sidewall, typically in an orientation capable of directing light onto the grilling surface in a manner which illuminates not only the grilling surface, but also any food which may be placed on the grilling surface. In further detail, if the particular barbeque grill has a left sidewall and a right sidewall, it may be desirable to mount one or more light sources on both the left sidewall and the right sidewall, depending, for example, on the amount of illumination desired.

In a further aspect, the heat source which is used to produce the heat which activates the thermoelectric generator may be positioned beneath the cooking surface of the barbeque grill. In fact, if desired, this same heat source also may be used to heat the cooking surface of the grill. For example, if a combustible gas is used, the heat source may be a burner or series of burners positioned beneath the cooking surface. Alternatively, if charcoal is used, the heat source may be the charcoal, as oriented on the charcoal grate or other charcoal support-surface.

In yet another aspect, the invention includes a first heat source and a second heat source. In this instance, the first heat source heats the cooking surface of the barbeque grill; and the second heat source heats the thermoelectric generator, thereby activating the generator so as to produce the electric power needed to operate the barbeque-grill accessory or accessories.

If desired, each of the first and second heat sources may include a combustible fuel, such as, for example, a combustible gas and/or charcoal. If a combustible gas is used, both the first and second heat sources may receive the combustible gas from a common combustible-gas supply. However, in a further aspect of the invention, regardless of whether the first heat source uses a combustible gas, the second heat source receives combustible gas from an independent supply, in other words, a supply which does not provide combustible gas to the first heat source.

In yet a further aspect, the invention includes: a support surface; a heat source; a thermoelectric generator in thermal proximity to the heat source, and activatable by heat produced from the heat source; and an illuminating light source. The illuminating light source is constructed and arranged so as to be powered, directly or indirectly, by the thermoelectric generator. In addition, the illuminating light source is further designed so as to direct illuminating light in the general direction of the support surface. In this fashion, a user may better see the support surface or an object placed on the support surface. Non-limiting examples of the support surface include a table, a shelf, a warming tray, a burner, a heating-element surface, and a barbeque-grill cooking surface.

BRIEF DESCRIPTION OF THE DRAWINGS

The accompanying drawings, which are incorporated in, and constitute a part of, this specification, illustrate embodiments of the invention and, together with the general description of the invention given above, and the detailed description of versions of the invention given below, serve to explain the principles of the invention.

DETAILED DESCRIPTION OF THE DRAWINGS

Figure 1:
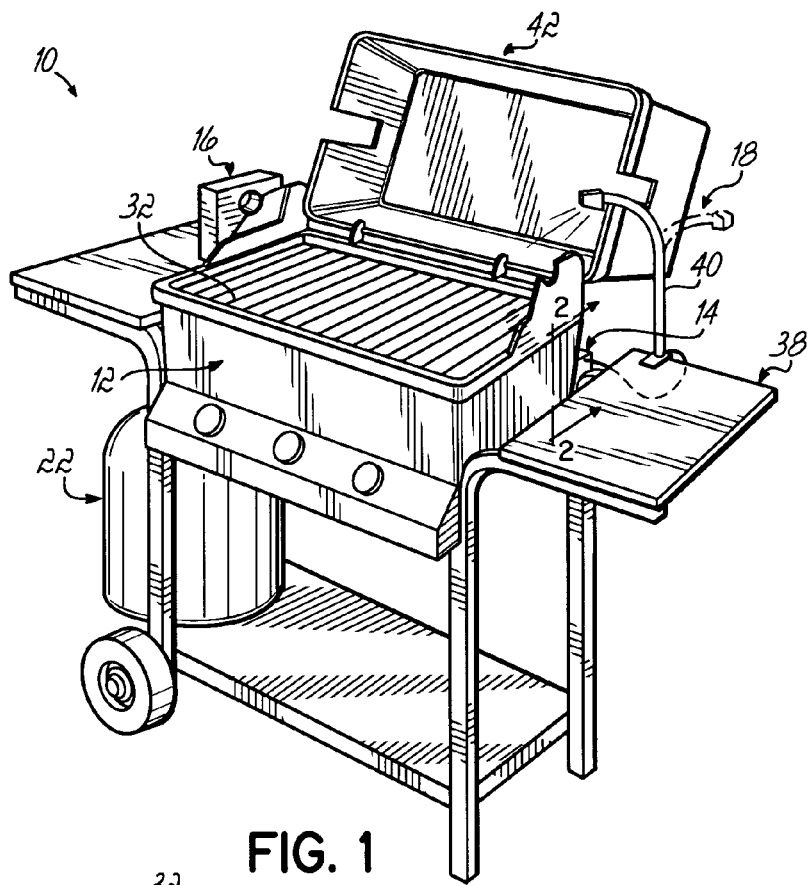
FIG. 1 is a perspective view of a barbeque grill system, in accordance with the principles of the invention.
Figure 2A:
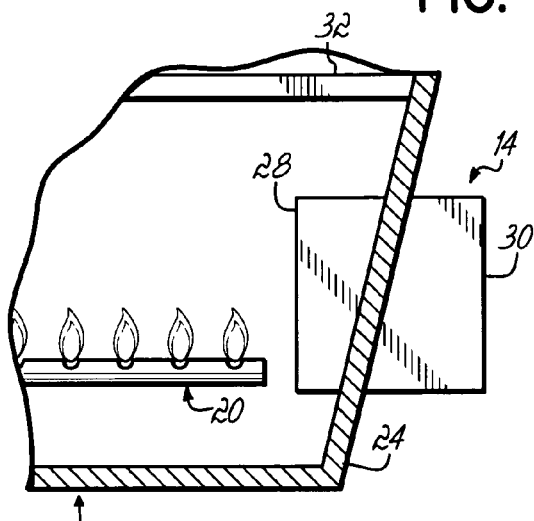
FIG. 2A is a side view, shown in partial cross section, of a portion of the barbeque grill system of FIG. 1.

With reference to FIGS. 1 and 2, a barbeque grill system 10 includes a barbeque grill 12, a thermoelectric generator 14 operable for producing electric power, and barbeque-grill accessories (rotisserie 16 and gooseneck light 18) capable of using electric power produced by the thermoelectric generator 14. In further detail, the barbeque grill 12 includes a heat source in the form of a burner element 20 (FIG. 2A) which is supplied with a combustible fuel in the form of a compressed gas from a supply tank 22 (FIG. 1). As seen in FIG. 2A, the thermoelectric generator 14 is mounted in the back wall 24 of the barbeque grill firebox 26. In further detail, the heat collection surface 28 of the generator 14 is positioned inside the firebox 26, and the heat sink surface 30 of the generator is positioned outside of the firebox 26. In this fashion, when the combustible gas reaches the burner element 20, and is ignited, heat from the combustion is able to activate the thermoelectric generator 14, thereby enabling the generator 14 to produce electric power. This electric power is then harnessed to operate one or more of the barbeque-grill accessories 16, 18 which are capable of using the electric power. For example, as shown in FIG. 1, power produced by the thermoelectric generator may be used to operate a light source such as the gooseneck light 18, and/or to power the rotisserie 16. In addition, as may be seen in FIG. 2A, the heat produced by the combustion of the gas at the burner element 20 also serves to heat the grill rack 32 positioned above the burner element 20, and if desired, may be used to heat the barbeque grill chamber created when the lid of the grill is in a closed position (not shown). The barbeque grill system may further include commercially-available flow-control valves, knobs, burner elements, gas conduit, igniters, and other conventional components, as will be appreciated by one of ordinary skill.

In this fashion, the invention offers several benefits and advantages to a user which are not found in traditional barbeque grills. For example, a user does not have to deal with the inconveniences, and even safety issues, associated with the use of one or more power cords running from the accessories to an electrical outlet. This feature also allows a user to operate the grill accessories in places where such outlets don't exist. And, although it may be possible to operate an illuminating light with one or more batteries, the reliance solely on batteries presents another host of problems. For example, if the batteries do not maintain a sufficient charge while the light is being used, then a user may find themselves quite literally "in the dark".

The thermoelectric generator of the invention may be any suitable thermoelectric generator. Such generators typically include a heat collection component, a heat sink component, and a thermoelectric module positioned between the two components or structures. If desired, any suitable commercially available thermoelectric generator may be used. Alternatively, if desired, such a generator may be assembled, as will be appreciated by one of ordinary skill in the art. One nonlimiting example of a suitable thermoelectric module is a module having the product code HZ-2, available from the High-Z Corporation of San Diego, Calif. If a metal plate or structure is used for heat collection, any suitable material may be used, with nonlimiting examples including metals and alloys which include copper and/or aluminum. In addition, as will be appreciated by one of ordinary skill, the heat sink may be any suitable structure capable of dissipating heat from the thermoelectric module. Nonlimiting examples of such structures include a metallic plate and/or a cooling fluid. If a metallic plate is used, examples of suitable metals include copper, and/or aluminum.

While the heat source used to activate the thermoelectric generator may be the burner element(s), charcoal, or the like which is used to cook the food placed on the grill rack of the barbeque grill, the heat source used to activate the thermoelectric generator may be a different heat source.

Figure 2B:
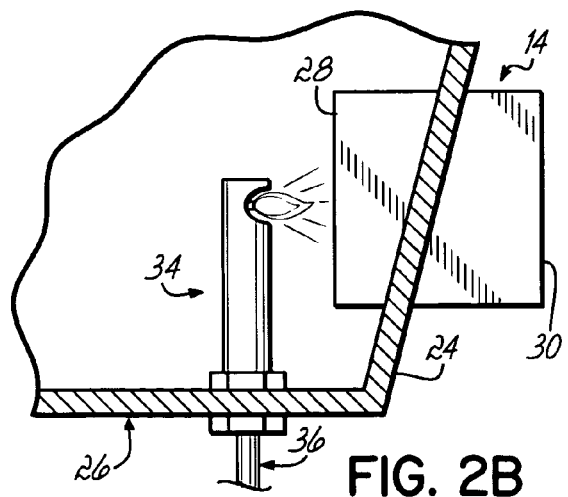
FIG. 2B is a side view, shown in partial cross section, of a portion of another version of the barbeque grill system, in accordance with the principles of the invention.

In another version of the barbeque grill system, and as shown in FIG. 2B, the heat source for activating the thermoelectric generator 14 may be a heat source having a primary, or even exclusive, function of providing heat to the heat collection surface 28 of the thermoelectric generator. As shown in FIG. 2B, the heat source includes a burner element 34 which directs the heat from a combusted gas toward the heat collection surface 28 of the thermoelectric generator 14. The combustible gas is supplied through a feedline 36, either from the supply tank 22 (FIG. 1) or from a separate, dedicated fuel supply (not shown).

Although FIGS. 2A and 2B show the thermoelectric generator 14 positioned in the back wall 24 of the firebox 26, the thermoelectric generator 14 may be placed in any suitable location. For example, the entire generator may be positioned outside of the firebox. In further detail, the heat collection member may be placed in physical contact with an exterior surface of a wall of the grill firebox or grill lid. Alternatively, the generator may be indirectly connected to the barbeque grill. For example, the generator may be mounted so that the generator, including the heat collection member, is spaced a given distance away from the barbeque grill, while still being activated by heat produced from a heat source within the firebox. In yet another version, the heat source which activates the generator may, itself, be wholly or partially positioned outside the firebox. In a further version, the thermoelectric generator and/or the heat source for activating the generator may be completely independent of the barbeque grill, and if desired, may be releasably attachable to the grill. In addition, multiple thermoelectric generators may be used in the same grill system, as desired.

As described briefly above, FIG. 1 includes barbeque-grill accessories in the form of a gooseneck light 18 and a rotisserie 16. The gooseneck light 18 is releasably attached to a shelf 38 of the grill 12. In addition, the elongated gooseneck arm 40 is resiliently bendable or deformable, thereby enabling a user to direct light in any of a number of different directions. For example, if a user has a plate of uncooked food positioned on the shelf 38, the user easily may bend or otherwise manipulate the gooseneck arm 40 so as to illuminate the uncooked food. In similar fashion, when the user is grilling the food, the user may direct the light onto the grill rack 32 (i.e., cooking surface) and the food positioned on the grill rack 32. Also, because the gooseneck arm 40 is highly adjustable, a user may move the arm 40 away from the grill lid 42 when they want to close the lid 42.

Figure 3A:
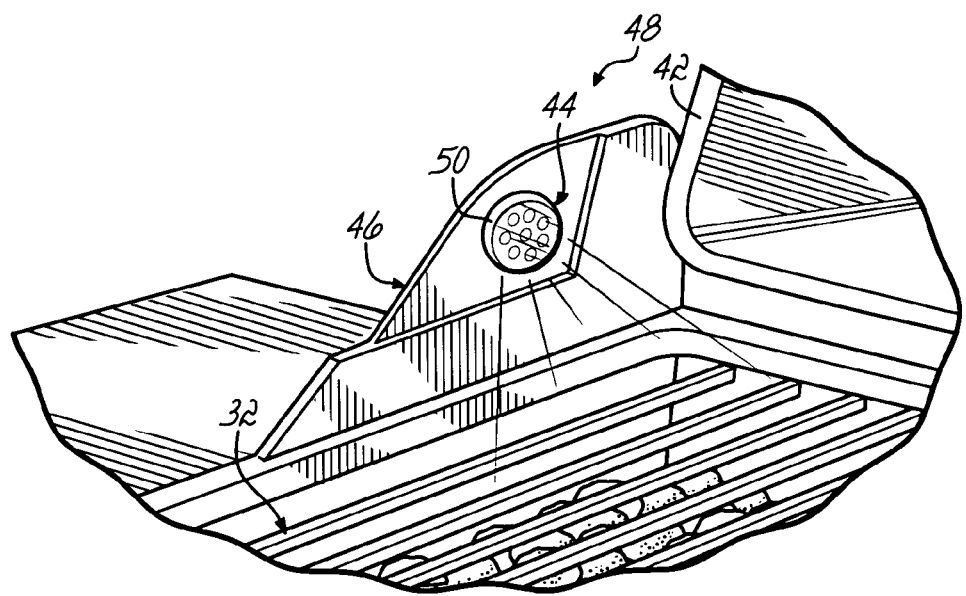
FIG. 3A is a perspective view of a portion of another barbeque grill system, in accordance with the principles of the invention.
Figure 3B:
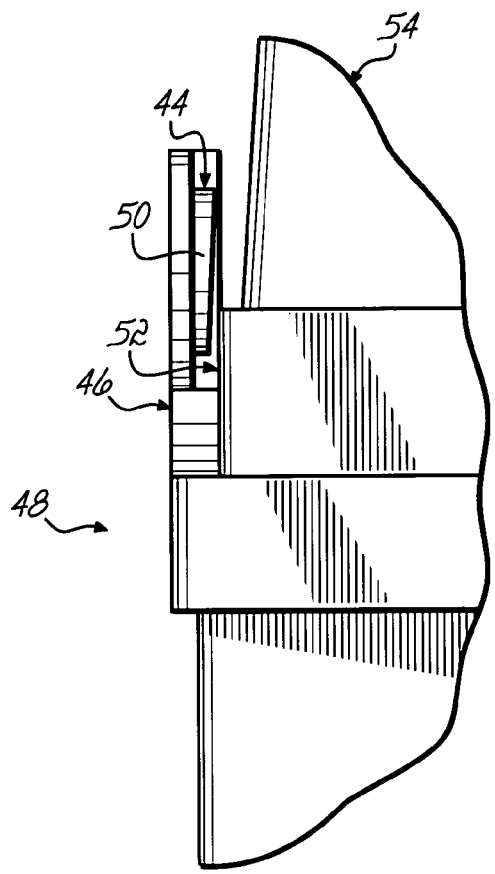
FIG. 3B is an elevated front view of a portion of the barbeque grill system substantially as shown in FIG. 3A.

FIGS. 3A and 3B show another version of the barbeque grill system, in which a light 44 is mounted in a sidewall 46 of a barbeque grill 48. As seen in FIG. 3A, the light 44 actually is a cluster of several individual lights. In this particular version, the light 44 is protected from smoke and grease in multiple ways. In particular, the light 44 includes a transparent lens 50. Also, as best seen in FIG. 3B, the particular sidewall 46 containing the light 44 is spaced just beyond the sidewall 52 of the barbeque grill lid 54. In this fashion, when the lid 54 is closed, the light 44 is not exposed to the smoke and/or grease which may continue to be generated in the interior space of the barbeque grill 48. Also, as best seen in FIG. 3B, in this particular version, the light 44 is positioned in the sidewall 46 at a slight downward angle. In this fashion, more of the illuminating light is directed onto the grill rack cooking surface (not shown).

As will be appreciated by the reader, although the Figures show the lighting in two particular locations, the invention is in no way limited to these particular locations. Rather, any suitable number of lights and styles of lights may be placed on or near the barbeque grill system, any of which may be powered by the thermoelectric generator, or multiple thermoelectric generators. In addition, the light source, itself, may be provided by any suitable light-producing member or combination of light-producing members. Nonlimiting examples include one or more light-emitting diodes ("LEDs"), halogen bulbs, xelogen bulbs, fluorescent bulbs, neon bulbs, fiber-optic filaments, and/or incandescent bulbs. In addition, any suitable electric controller or combination of controllers may be used, as will be appreciated by one of ordinary skill in the art.

Also, if desired, the barbeque grill assembly may include one or more energy storage devices, as will be appreciated by one of ordinary skill. For example, one or more batteries and/or capacitors may be electrically coupled to the thermoelectric generator(s) and the barbeque-grill accessory or accessories. Given that it typically takes a brief period of time for a thermoelectric generator to reach its activation temperature, this feature of energy storage may be beneficial in situations where a user would like to begin using an accessory prior to activation of the thermoelectric generator.

While the present invention has been illustrated by a description of various versions, and while the illustrative versions have been described in considerable detail, it is not the intention of the inventor to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of the inventor's general inventive concept.

What is claimed is:

1. A combination, comprising:
    a barbecue grill including a cooking surface and a first heat source, the cooking surface constructed and arranged to be heated by heat produced from the first heat source;
    a second heat source;
    a thermoelectric generator operable for producing electric power, the thermoelectric generator activatable by heat produced from the heat source so as to produce electric power; and
    a barbecue-grill accessory capable of using electric power, the barbecue-grill accessory constructed and arranged so as to receive electric power produced by the thermoelectric generator once the thermoelectric generator has been activated by heat produced from the second heat source.

2. The combination of claim 1 wherein the barbecue-grill accessory is selected from the group consisting of a light source, a rotisserie, and combinations thereof.

3. The combination of claim 1 wherein the barbecue-grill accessory includes a light source.

4. The combination of claim 3 wherein the light source includes a light-producing member selected from the group consisting of a light-emitting diode (LED), a halogen bulb, a xelogen bulb, a fluorescent bulb, a neon bulb, a fiber-optic filament, an incandescent bulb, and combinations thereof.

5. The combination of claim 3 wherein the light source includes a plurality of LEDs.

6. The combination of claim 3 wherein the light source is positioned on an elongated arm.

7. The combination of claim 6 wherein the elongated arm is adjustable, whereby a user may move the light source in a plurality of different directions.

8. The combination of claim 6 wherein the elongated arm is releasably attachable to the barbecue grill.

9. The combination of claim 3 wherein the barbecue grill includes a sidewall, and the light source is mounted at the sidewall.

10. The combination of claim 1 wherein the first heat source is positioned beneath the cooking surface.

11. The combination of claim 1 wherein each of the first heat source and the second heat source includes a combustible fuel, the combustible fuel capable of producing heat upon combustion.

12. The combination of claim 11 wherein the combustible fuel is selected from the group consisting of a combustible gas, charcoal, and combinations thereof.

13. The combination of claim 11 wherein the combustible fuel is a combustible gas.

14. The combination of claim 13 wherein the first heat source and the second heat source receive the combustible gas from a common combustible gas supply.

15. The combination of claim 1 wherein the second heat source includes a combustible gas burner, the combination further including a combustible gas supply operable for providing a combustible gas to the second heat source, but not to the first heat source.

16. The combination of claim 1 wherein the thermoelectric generator is in thermal proximity to the heat source.

* * * * *